(12) United States Patent
Selvaraj et al.

(10) Patent No.: US 9,960,963 B2
(45) Date of Patent: May 1, 2018

(54) DYNAMIC CLIENT FAIL-OVER DURING A ROLLING PATCH INSTALLATION BASED ON TEMPORAL SERVER CONDITIONS

(71) Applicant: Oracle International Corporation, Redwood Shores, CA (US)

(72) Inventors: Santhosh Selvaraj, Sunnyvale, CA (US); Prasad V. Bagal, Saratoga, CA (US); Harish Nandyala, Fremont, CA (US); Hanlin Chien, Sunnyvale, CA (US)

(73) Assignee: Oracle International Corporation, Redwood Shores ( * ) Notice: Subject to any disclaimer, the term of this patent is extended or adjusted under 35 U.S.C. 154(b) by 435 days.

(21) Appl. No.: 13/925,484

(22) Filed: Jun. 24, 2013

(65) Prior Publication Data
US 2014/0376362 A1 Dec. 25, 2014

(51) Int. Cl.
*H04L 12/24* (2006.01)

(52) U.S. Cl.
CPC ........ *H04L 41/082* (2013.01); *H04L 41/0663* (2013.01); *H04L 41/0846* (2013.01); *H04L 41/0889* (2013.01)

(58) Field of Classification Search
CPC . H04L 41/082; H04L 41/084; H04L 41/0846; G06F 11/203
See application file for complete search history.

(56) References Cited

U.S. PATENT DOCUMENTS

| | | | |
|---|---|---|---|
| 7,805,503 B2 | 9/2010 | Bagal | |
| 2009/0210527 A1* | 8/2009 | Kawato | 709/224 |
| 2010/0235825 A1* | 9/2010 | Azulay et al. | 717/172 |
| 2014/0222818 A1* | 8/2014 | Kikuchi et al. | 707/737 |
| 2014/0237090 A1* | 8/2014 | Lassen | H04L 41/00 709/223 |
| 2014/0282475 A1 | 9/2014 | Bagal et al. | |

OTHER PUBLICATIONS

Oracle Fail Safe Installation Guide—Release 3.4.2 for Microsoft Windows, Oct. 2009, 56 pages.*
Rolling Upgrade to Windows Server 2008 SP2 Failover Clustering, Jun. 12, 2009, 7 pages.*

(Continued)

*Primary Examiner* — Hoon J Chung
(74) *Attorney, Agent, or Firm* — Vista IP Law Group, LLP

(57) ABSTRACT

A method, system, and computer program product for upgrade procedures in high-availability clustered systems. The method selects fail-over nodes during rolling patch installation and comprises steps for identifying a first node to upgrade, migrating services of the first node to a second node and shutting down the first node to perform its upgrade, then migrating the services back from the second node to the first node. When performing an upgrade of the other nodes of the cluster (e.g., nodes of the cluster other than the first node), rather than migrating the services of the node to be upgraded to another node that still needs to be upgraded, instead migrate the services of the node to be upgraded to a node that has already been upgraded. This reduces the brown-out time at least to the extent that this method incurs only one migration per node rather than two migrations per node.

23 Claims, 9 Drawing Sheets

(56) References Cited

OTHER PUBLICATIONS

Shrivastava et al., Application-aware Virtual Machine Migration in Data Centers, Mini-Conference at IEEE INFOCOM 2011, 5 pages.*
Microsoft, Upgrade a SQL Server Failover Cluster Instance (Setup), Nov. 27, 2011, 5 pages.*
Drew et al., How to Update a Red Hat Enterprise Linux Cluster while Minimizing Downtime, Nov. 25, 2010, Red Hat, 3 pages.*

* cited by examiner

DYNAMIC CLIENT FAIL-OVER DURING A ROLLING PATCH INSTALLATION BASED ON TEMPORAL SERVER CONDITIONS

RELATED APPLICATIONS

Certain aspects in some embodiments of the present application are related to material disclosed in U.S. Pat. No. 7,805,503, entitled "CAPABILITY REQUIREMENTS FOR GROUP MEMBERSHIP" filed on May 10, 2007, and certain aspects in some embodiments of the present application are related to material disclosed in U.S. patent application Ser. No. 13/832,381, entitled "EMBEDDING PATCH LISTS WITHIN COMPILED PROGRAM CODE" filed on Mar. 15, 2013, the content of which is incorporated by reference in its entirety in this application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of upgrade procedures in high-availability clustered client-server systems and more particularly to techniques for intelligently selecting fail-over nodes during a rolling patch installation.

BACKGROUND

In a high-availability clustered client-server environment, upgrading or patching individual server nodes can be done in a rolling manner by upgrading one node at a time. Generally such a rolling upgrade regime can be performed without total outage, however at least some database services (e.g., database connections) need to be at least temporarily disconnected while its corresponding node is subjected to upgrade and patching operations.

Given a high-availability cluster and a regime where a client has at least some legacy fail-over capabilities, a client that was initially connected to a server and then becomes disconnected would try to select a new server in the cluster whenever it detects loss or certain impairments of the connection.

Unfortunately legacy techniques fail to consider a sufficiently full range of criteria when selecting a new server in the cluster, and in some cases, an ill-selected node onto which to fail-over can cascade into yet another fail-over situation, and another ill-selected node onto which to fail-over can cascade into still yet another fail-over situation and so on. Yet, the time period during fail-over operations can cause brownouts or outages, and in some cases brown-outs can affect mission-critical facilities.

What is needed are techniques that account for dynamically-changing cluster conditions during performance of rolling patch installations, and respond by intelligently selecting fail-over nodes during the rolling patch installation in order to minimize down-time or brown-out time.

Moreover, none of the aforementioned technologies have the capabilities to perform the herein-disclosed techniques for intelligently selecting fail-over nodes during a rolling patch installation. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for intelligently selecting fail-over nodes during a rolling patch installation.

Disclosed herein are methods, systems, and computer program products for upgrade procedures in high-availability clustered systems. The method intelligently selects fail-over nodes during rolling patch installation and/or during upgrades of multiple nodes. For purposes of this disclosure, the term "rolling patch" and the term "upgrade" are used interchangeably.

As further described below, some of the herein-disclosed method steps comprise identifying a first node to upgrade, migrating services of the first node to a second node, and shutting down the first node to perform its upgrade. After performing the upgrade on the first node, then migrating the services back from the second node to the just-upgraded first node. When performing an upgrade of the other nodes of the cluster (e.g., nodes of the cluster other than the first node), rather than migrating the services of the node to be upgraded to another node that still needs to be upgraded, the disclosed technique instead migrates the services of the node to be upgraded to a node that has already been upgraded. This reduces the down-time or brown-out time at least to the extent that this method incurs only one migration for those nodes rather than two migrations per node. Those skilled in the art will recognize that migration costs can be substantial, so reducing down-time or brown-out time incurred by migration can be commensurately substantial.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1A:
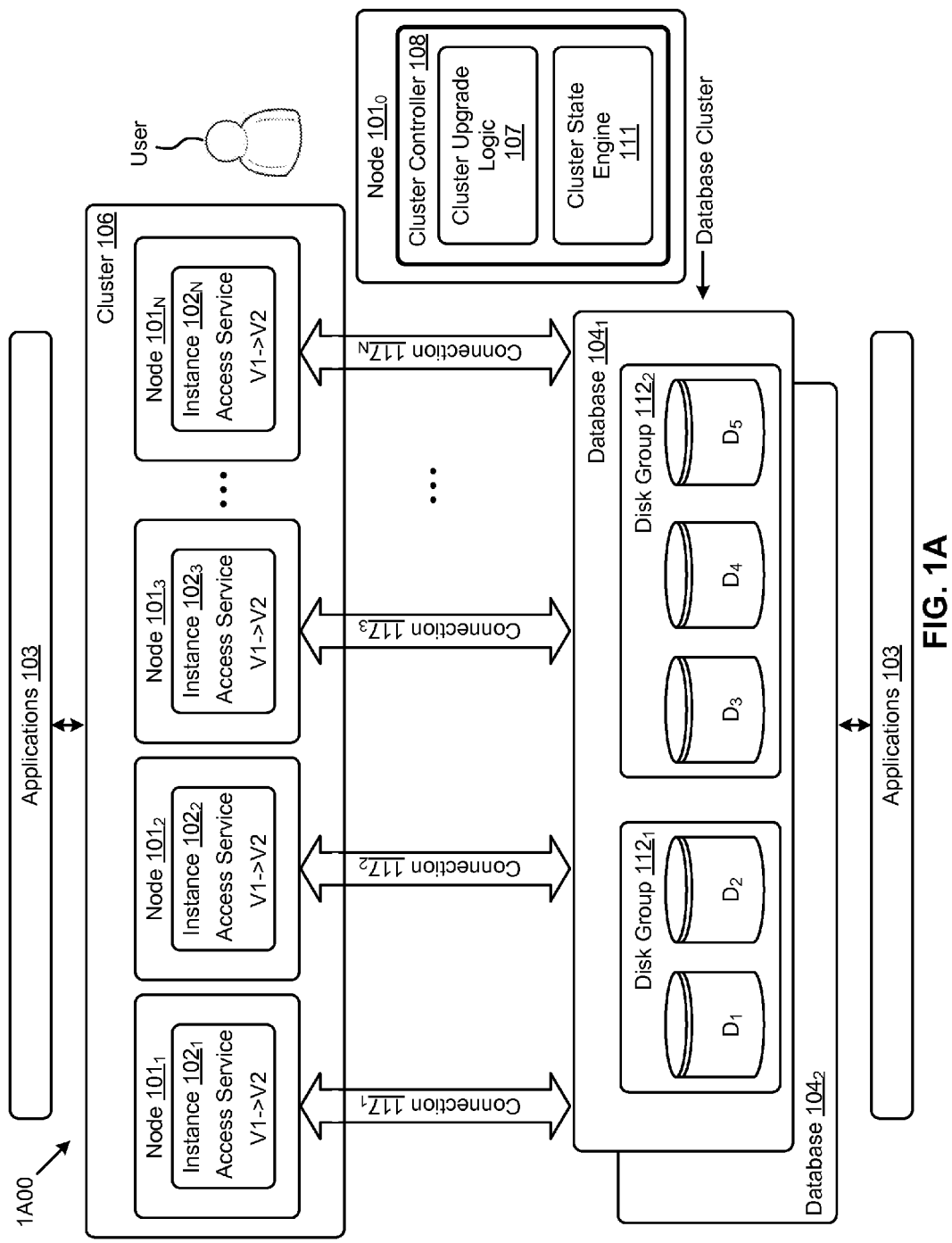
FIG. 1A is an environment in which rolling patch upgrades can be performed while intelligently selecting fail-over nodes during a rolling patch installation, according to some embodiments.

Some embodiments of the present disclosure address the problem attendant to upgrades and of rolling patch installations on clusters. More particularly, disclosed herein and in the accompanying figures are exemplary environments, methods, and systems for intelligently selecting fail-over nodes during a rolling patch installation.

Overview

Disclosed herein are techniques that consider a wide range of criteria when selecting a new server in the context of a rolling patch installation in a database cluster.

The rolling patch installation serves to perform an upgrade (e.g., database schema upgrade, code patch, middleware patch, etc.). In exemplary embodiments, the rolling patch installation is performed while at least some production services continue to run. In a clustered environment, the rolling patch installation is accomplished by performing upgrade operations on successive next nodes. Upgrade operations comprise (but are not limited to):

Selecting a subject node to be upgraded;
Selecting a fail-over node upon which node to move the services of the subject node to be upgraded;
Taking the subject node offline, possibly by bringing down the subject node's connection to a database;
Performing patches and upgrades to components of the subject node to generate an upgraded node;
Rebooting the upgraded node;
Establishing the upgraded node's connection to the database;
Re-establishing services from the upgraded node; and
Selecting a next subject node to be upgraded.

Executing the upgrade one node at a time facilitates limiting or eliminating database system brown-outs or other suspension or reduction of services or performance. Yet, naïve selection of a fail-over node upon which node to move the services of the subject node to be upgraded can cascade into yet another fail-over situation, and another naïvely-selected node onto which to fail-over can cascade into still yet another fail-over situation and so on. Depending on which new server is selected to fail-over to, the number of "hops" or attempts taken during the course of this rolling upgrade process might be unnecessarily large. An egregious case occurs when a fail-over selects a non-patched node which is soon to be subjected to a patch upgrade, and then, upon the event of being subjected to initiation of a patch upgrade, then yet again, the non-patched node is shut down for patching (see FIG. 1A). The techniques presented herein serve to ensure that clients take fewer "hops" during a rolling patch installation procedure, and that the cluster is quickly brought to a fully-operational state after completing the rolling patch installation.

The disclosed techniques and systems implement solutions where a node (e.g., a client node and/or an agent node or a listener node) will have intelligence to accomplish failing over to a compatible and already patched/upgraded server. In a clustered environment, database instances (see FIG. 1A) would register with an agent node or a listener node that is running on (or is accessible to) the cluster, and each database instance would provide its version, its patch-level, and other configuration/compatibility information as well as certain state information (see FIG. 2). Any number of database instances can register (e.g., WRITE) and any client can access (e.g., READ) data structures managed by one or more listeners, and thereby a particular client instance (or its agent processes) can gain knowledge of which database instances have been already upgraded, and which instances might be subjected to a soon-to-occur upgrade cycle. In some cases, a plurality of criteria and/or heuristics can be applied in order to intelligently select client fail-over nodes based on temporally changing conditions (see FIG. 4), including selecting based on an upgrade sub-state of a node being upgraded (see FIG. 5).

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A is an environment 1A00 in which rolling patch upgrades can be performed while intelligently selecting fail-over nodes during a rolling patch installation. As an option, the present environment 1A00 may be implemented in the context of the architecture and functionality of the embodiments described herein. Also, the environment 1A00 or any aspect therein may be implemented in any desired environment.

As shown, a cluster of nodes (e.g., cluster 106) is comprised of a plurality of nodes (e.g., node $101_1$, node $101_2$, node $101_3$, node $101_N$, etc.), and each node of the cluster has a database connection (e.g., connection $117_1$, connection $117_2$, connection $117_3$, connection $117_N$, etc.) to provide a communication path between a particular node and a particular instance of a database (e.g., database instance $104_1$, database instance $104_2$, etc.).

An instance of a database within a database cluster may be comprised of one or more disk groups (e.g., disk group $112_1$, disk group $112_2$, etc.), and each disk group may further be comprised of any number of storage devices (e.g., $D_1$, $D_2$, $D_3$, $D_4$, $D_5$, etc.). A disk group may employ magnetic media, and/or flash memory, and/or semiconductor memory in any mixture. The connections to the database may be implemented using any physical communication techniques (e.g., Fiber Channel, Ethernet, a shared bus, etc.). In some situations the definition of, and/or management of, any disk or disks within a disk group can be provided by a computational unit outside of the database cluster. For example, and as further discussed below, definition of, and/or management of any disk or disks within a disk group can be provided by an access instance (see instance $102_1$, instance $102_2$, instance $102_3$, instance $102_N$, etc.).

The database cluster serves to persistently store data. Access to such persistently-stored data can be provided by one or more access instances; for example, an instance of an automatic storage management client (see instance $102_1$, instance $102_2$, instance $102_3$, instance $102_N$, etc.), which access instance or instances serve to provide access services (e.g., instance $102_1$, instance $102_2$, instance $102_N$ etc.) to software applications 103. As used herein, such an access instance comprises memory structures that can be used to provide access to the full extent of data stored in the database cluster. Further, such instances can control several physical disks (e.g., a disk group 112) as a single unit. An automatic storage management client can perform operations to manage groups of disks, manage disk redundancy features, and can perform automated I/O balancing. Furthermore, database cluster (e.g., database instance $104_1$) serves to persistently store data as may be used in performing rolling upgrades, and as may be used for intelligently selecting fail-over nodes during a rolling patch installation. Strictly as one example, a database instance might store an indication of a last stable version, which is used in some algorithms for intelligently selecting fail-over nodes.

Also shown is a cluster controller 108, which in turn may comprise cluster upgrade logic and a cluster state engine 111. The cluster controller function may be deployed on any node, which node might (or might not) perform access services in addition to performing cluster controller functions and/or cluster upgrade services. In exemplary configurations, a cluster controller is deployed on a node other than an instance node.

Referring to the context of a rolling patch installation, cluster upgrade logic may be employed to sequence the upgrades by selecting a node for upgrade, initiating an upgrade cycle on a node, performing a series of upgrade steps, and rebooting the selected node. As shown, each of the nodes is slated to undergo an upgrade from version "V1" to version "V2". As depicted, the nodes are operating under version "V1".

A cluster state engine can store a cluster-wide state as time progresses. For example, if at some moment in time any node of the cluster is in the midst of any portion of a rolling upgrade, then that cluster might be marked as state="IN_ROLLING", and the cluster-wide state might also be marked as "IN_ROLLING". At some moment in time, all of the nodes to be upgraded in the context of a particular rolling patch installation cycle might be deemed to have been successfully upgraded, and the cluster-wide state might be marked as state="NORMAL". State transitions are further discussed as pertains to FIG. 2.

As can be recognized, bringing down a node for upgrade can have the effect that services provided by that node are temporarily stopped. In order to minimize the effect of bringing down a node for upgrade, embodiments such as given in environment 1A00 might re-deploy the services provided by that node to another node in the cluster. Systems and techniques for intelligently selecting fail-over nodes during a rolling patch installation so as to minimize the duration and impact of lost services is now briefly discussed.

Figure 1B:
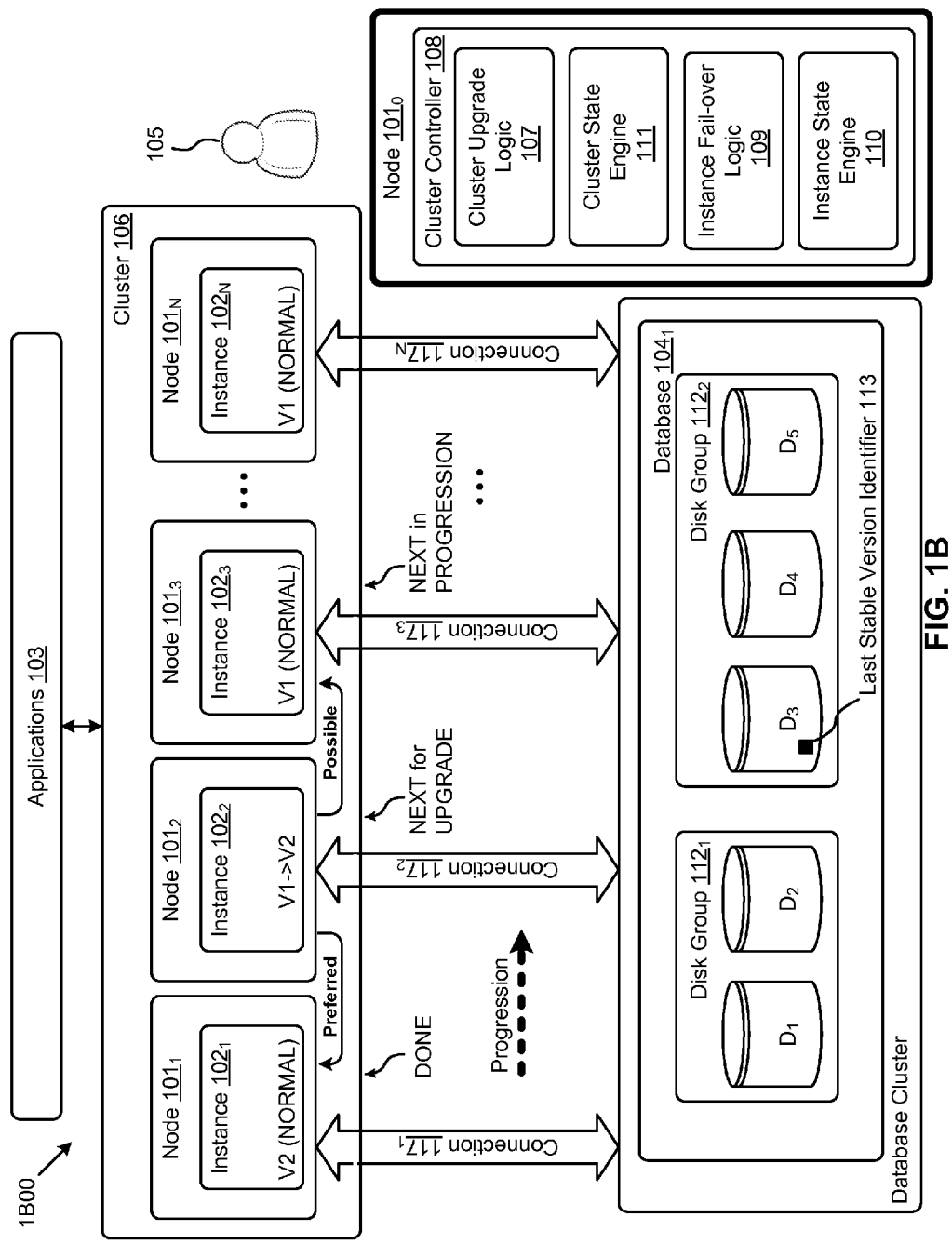
FIG. 1B depicts a system including instance fail-over logic for intelligently selecting fail-over nodes during a rolling patch installation, according to some embodiments.

FIG. 1B depicts a system 1B00 including instance fail-over logic for intelligently selecting fail-over nodes during a rolling patch installation. As an option, the present system 1B00 may be implemented in the context of the architecture and functionality of the embodiments described herein. Also, the system 1B00 or any aspect therein may be implemented in any desired environment.

Comparing to FIG. 1A, the capability of cluster controller 108 is extended to include "listeners" in the form of processes or logic such as the shown instance fail-over logic 109, and instance state engine 110. The instance fail-over logic serves to intelligently select client fail-over nodes during a rolling patch installation (e.g., in a sequence). Further, the instance state engine can listen to instances so as to capture, maintain, and report the state and sub-states of any of the nodes.

In particular, a node might be identified to become the next subject node in the sequenced rolling upgrades, and its state might be marked at the appropriate moment as "IN_ROLLING". Any node of the cluster can query any listener (e.g., instance fail-over logic 109, and/or instance state engine 110, etc.) in order to retrieve the then current state. Other states are traversed during the course of a rolling upgrade, and such other states and sub-states are discussed in FIG. 2.

More particularly, in an exemplary embodiment, an instance (e.g., instance $102_1$) might register with a listener by supplying its version, patch-level and state to the listener. In some embodiments, instances discover listener processes and connect to a database instance after contacting a listener. In some embodiments instances discover listener processes and merely query a listener before connecting to database, and the listener stores the version, patch-level and the state of the server (e.g., access instance) while the instance undergoes the upgrade. During a rolling upgrade or patching of the nodes comprising the database cluster, an instance would reconnect to another instance by communicating with the listener process(es) in order to determine a node onto which to fail-over. For example, an access instance would provide the information of the database it was connected to, and the listener would direct the to-be-upgraded instance to fail-over to an appropriate database instance (if available). Various techniques are provided to evaluate candidate nodes against a range of criteria (see FIG. 4) such that an appropriate fail-over node can be intelligently selected. Such criteria can include cluster state, transition versions (e.g., to/from versions), patch levels (e.g., from_version/patchlevel and to_version/patchlevel) and comparing it with the instance about to undergo operations (including disconnecting from the database) during the progression of the rolling upgrade/patching of an entire cluster. Further details regarding the quantification of transition versions is shown and discussed pertaining to FIG. 3.

Referring again to the environment 1A00, all nodes are slated to be upgraded from V1 to V2. A user (e.g., system administrator) might define a sequence or progression for upgrade (e.g., progress from "left to right", or progress from the 1$^{st}$ node through successively higher node numbers, etc.). As an example, a sequence is depicted using the progression arrow as shown in FIG. 1B.

Following such a progression, at some point in time, a node might become next for upgrade (see node $101_2$), and the services running on that node should be re-deployed on another node of the cluster so as to reduce loss of services. In one case, the next node in the progression might be selected. This is a possible case (and is shown as a "possible" selection of node $101_3$), yet, following the techniques described herein, application of a range of criteria might result in a preferred node being selected (shown as a "preferred" selection of node $101_1$).

As discussed above, selection of a preferred node for fail-over can include a range of criteria, including (but not limited to) "to/from" version characteristics as well as the temporal state of a candidate fail-over node. Some of such states are now briefly discussed.

Figure 2:
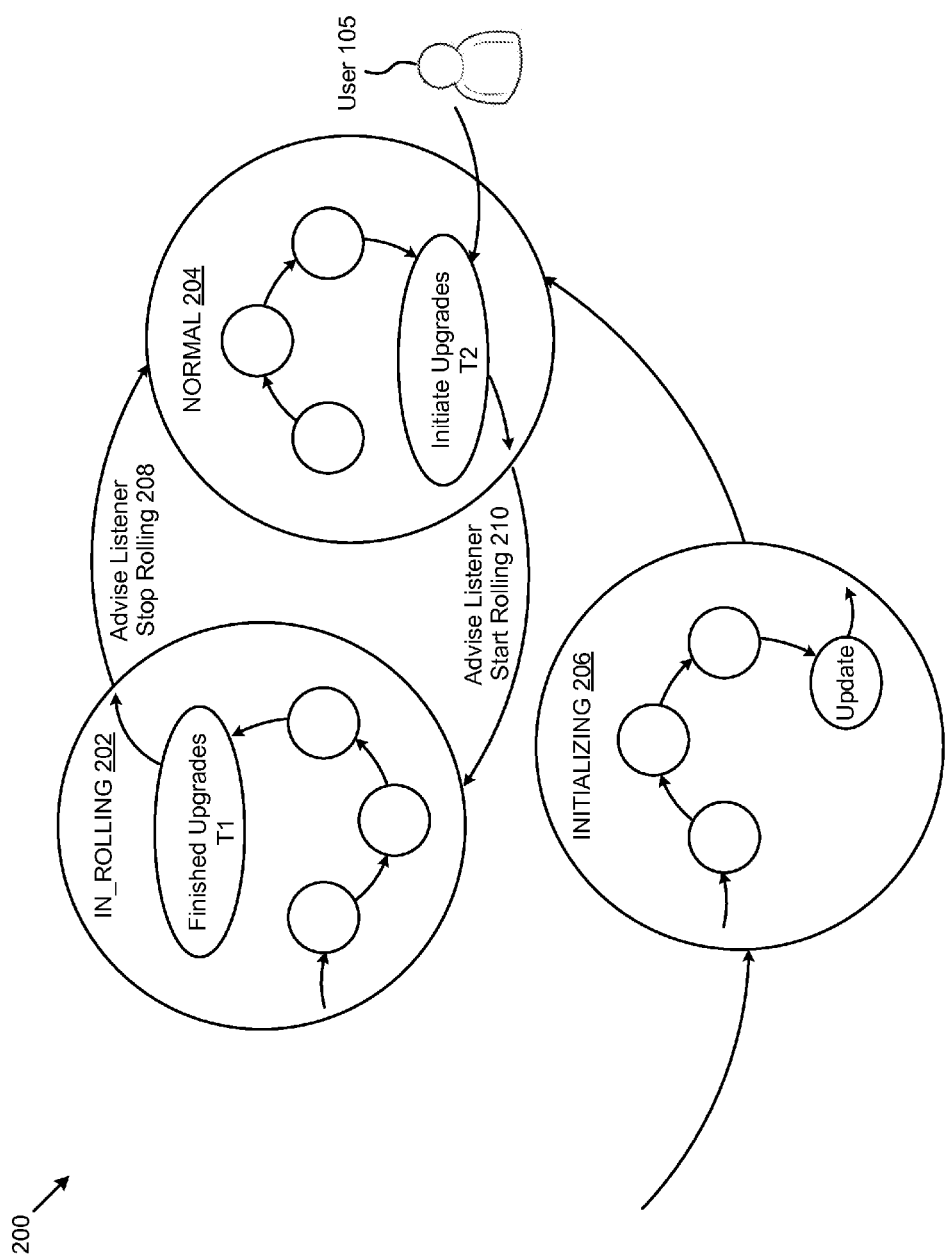
FIG. 2 is a state diagram showing states through which rolling patch upgrade logic can traverse while intelligently selecting fail-over nodes during a rolling patch installation, according to some embodiments.

FIG. 2 is a state diagram 200 showing states through which rolling patch upgrade logic can traverse while intelligently selecting fail-over nodes during a rolling patch installation. As an option, the present state diagram 200 may be implemented in the context of the architecture and functionality of the embodiments described herein. Also, the state diagram 200 or any aspect therein may be implemented in any desired environment.

As shown, a cluster can be in a state labeled NORMAL state 204, and this state refers to normal operation using the indicated version. Upon a command (e.g., a command from a user 105 to initiate a rolling upgrade) the rolling upgrade might begin (see command to start rolling 210), thus moving the cluster to be upgraded into the shown IN_ROLLING state 202. At some point in time the upgrade operations complete, or for some other reason, the cluster transitions back to NORMAL (see command to stop rolling 208). And at some point in time the cluster might be re-booted with the upgraded components. Upon bring-up, the cluster might enter the INITIALIZING state 206 (as shown), and would further transition to state=NORMAL when the initialization tasks have completed.

The cluster state is accessible to any node. Strictly as examples, as part of initializing, a node might retrieve the cluster state and perform a compatibility check. If cluster state is NORMAL, the node joining the cluster should be of the same version as other nodes. Otherwise, if the cluster is IN_ROLLING (e.g., being upgraded from V1 to V2) then the node would pass this compatibility check, and would join only if it is running under version V1 or under version V2. If the node deems itself to have passed its compatibility checks, the then current cluster state is recorded in the node (e.g., either state=NORMAL or state=IN_ROLLING). Further, if the joining node is the first node to join the cluster, it would update its version to be equal to the cluster version and would update its state as state=NORMAL.

In exemplary situations the aforementioned "last stable version" identifier can be considered during processes within the INITIALIZING state 206. More specifically, a "last stable version" identifier can be used to store the version of the instance as of the last time the instance was connected to a database when the cluster was in state=NORMAL. Strictly as an example, and referring to the depiction of FIG. 1B, if a database was connected to an instance on node $101_2$ (e.g., while running V1, as shown), and then the cluster state changes to state=IN_ROLLING, then the "last stable version" identifier would be V1. Now, if node $101_2$ is shut down, the database would fail-over to node $101_1$ (running V2, as shown), however the "last stable instance" identifier as recorded in the database (e.g., see last stable version identifier 113) would still remain as V1. The "last stable instance" identifier as recorded in the database would be updated to V2 when the cluster state changes back to "NORMAL" and the database is connected to a node with version V2.

In some cases, the shown IN_ROLLING state can comprise further states or sub-states, as indicated. Specific sub-states are discussed in FIG. 5. In the shown embodiment, there are multiple sub-state transitions within state=NORMAL and within state=IN_ROLLING. The event of reaching a terminal sub-state within a state is sent to a cluster controller or other form of listener. Since the access instances do not become candidates for patching until the cluster transitions into an IN_ROLLING terminal state (e.g., see terminal state T1), then it follows that when a database fail-over is initiated due to the event of an access instance being shutdown, such a fail-over event occurs in the IN_ROLLING terminal state. Listeners are updated (as shown) upon entry to a terminal state T1 or T2 and the decision for fail-over depends on the most recently entered terminal state (e.g., T1 or T2).

Figure 3:
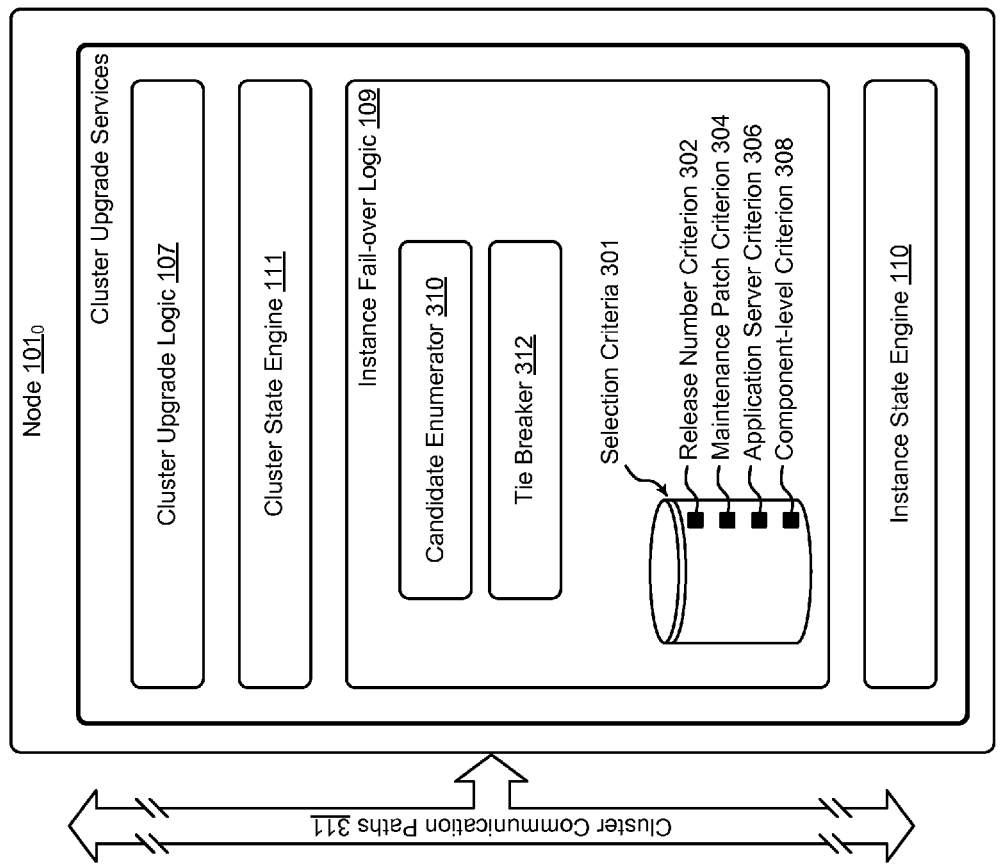
FIG. 3 depicts a subsystem including cluster upgrade services employed for intelligently selecting fail-over nodes during a rolling patch installation, according to some embodiments.

FIG. 3 depicts a subsystem 300 including cluster upgrade services employed for intelligently selecting fail-over nodes during a rolling patch installation. As an option, the present subsystem 300 may be implemented in the context of the architecture and functionality of the embodiments described herein. Also, the subsystem 300 or any aspect therein may be implemented in any desired environment.

As shown, a range of cluster upgrade services is provided on a node (e.g., see node $101_0$) and such services can comprise instances or variants of the aforementioned cluster upgrade logic 107, and/or a cluster state engine 111, and/or instance fail-over logic 109. Embodiments of the service providers communicate with each other cooperatively and can communicate with any other component of the cluster using one or more cluster communication paths 311.

The shown instance fail-over logic 109 serves to facilitate intelligently selecting fail-over nodes during a rolling patch installation as follows:
  Enumerate candidate nodes to become a target fail-over node (see candidate enumerator 310);
  Apply criteria (see selection criteria 301) over the enumerated candidate nodes;
  Employ a technique to select one particular candidate node in the event that there are multiple candidate nodes that satisfy constraints of the applied criteria and/or are given the same quantitative assessment (see tie breaker 312).

The selection criteria can comprise various version-centric criterion, for example, release number criterion 302, maintenance patch criterion 304, application server criterion 306, and component-level criterion 308. Also, the aforementioned "last stable version" identifier can be considered in the selection/rejection process. For example, the listener can use the "last stable version" (e.g., version="V1") as provided by the database (see last stable version identifier 113) to determine that a particular version (e.g., V2) is indeed the version to pursue when the cluster state moves to "IN_ROLLING". The aforementioned particular version can be a "higher version" or can be a "target version", or the particular version can merely be a next version that is in some regard different (e.g., at a different patch level) from a previous version.

In addition to the version-centric criterion just discussed, the exemplary implementation of subsystem 300 and the depicted selection criteria 301 facilitates use of any version-centric criteria and any number of methods, techniques or processing flows for intelligently selecting a fail-over node in a cluster environment during a rolling upgrade.

Figure 4:
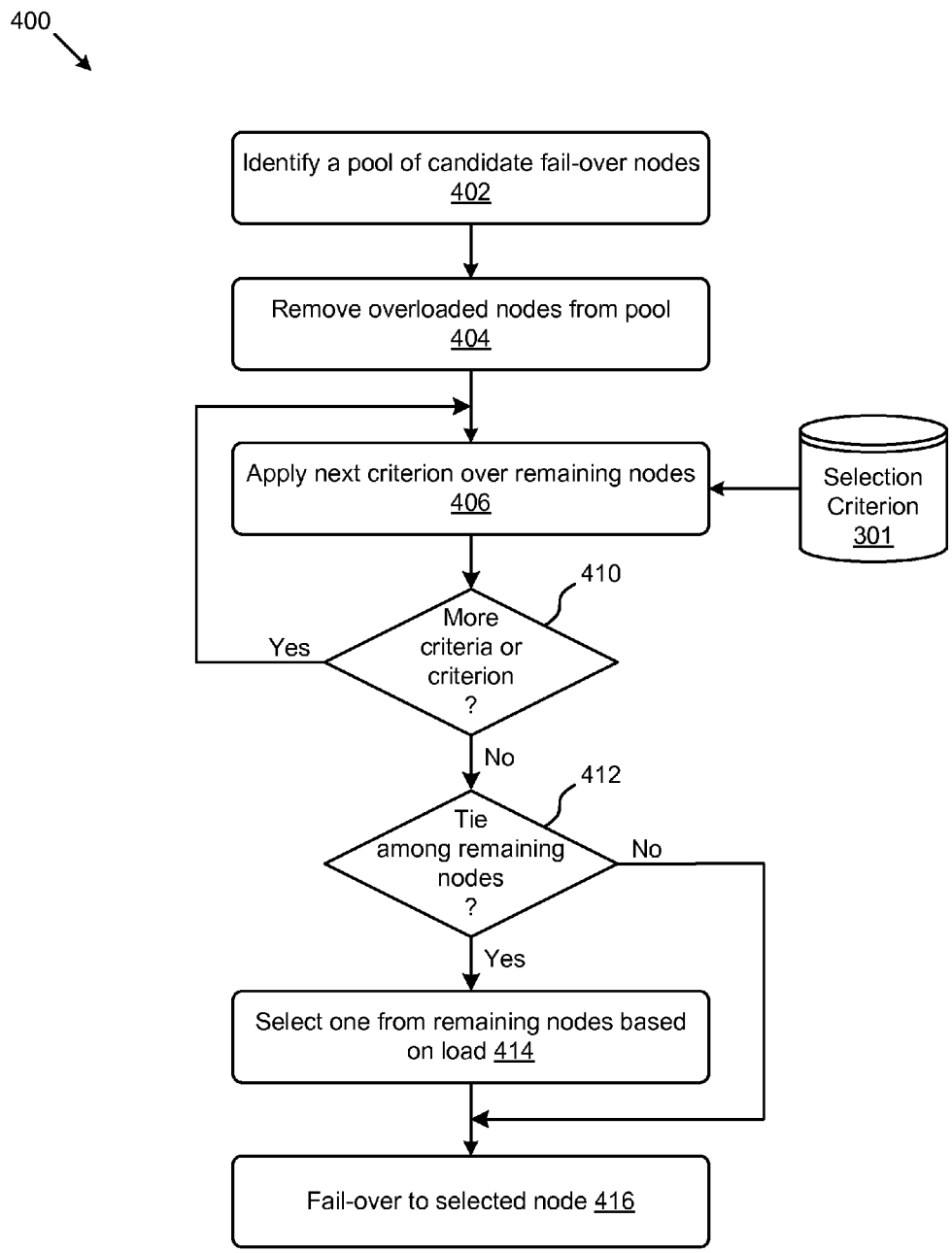
FIG. 4 is a flow chart used to apply multiple criteria for intelligently selecting fail-over nodes during a rolling patch installation, according to some embodiments.

FIG. 4 is a flow chart 400 used to apply multiple criteria for intelligently selecting fail-over nodes during a rolling patch installation. As an option, the present flow chart 400 may be implemented in the context of the architecture and functionality of the embodiments described herein. Also, the flow chart 400 or any aspect therein may be implemented in any desired environment.

As shown, the flow commences by identifying a pool of fail-over nodes 402. The pool can comprise all nodes in a cluster, or it can comprise only nodes that adhere to some particular specification (e.g., as may be specified in a set of best practices). Inasmuch as a selected fail-over node would be the target for hosting the services of the to-be-upgraded node, then it is reasonable that one possible next step is to remove from the pool nodes that are already deemed to be overloaded (see operation 404). Again referring to listeners and other cluster upgrade services of FIG. 3, a process (e.g., candidate enumerator 310) might poll the nodes of the cluster to query their respective load. Or, any one or more nodes may report their load to a process. As such, nodes deemed to be already fully-loaded, or would be deemed to become fully-loaded should they become the target for hosting the services of the to-be-upgraded node, then it is reasonable that those nodes be removed from the pool.

Now, any number of criteria can be applied in order to evaluate and select a candidate node. Such criteria can come in the form of a data structure or database (e.g., as depicted in selection criteria 301). A loop is formed to apply a next successive criterion to the remaining nodes (see operation 406), and the loop can exit when it is determined there are no more criteria to apply (see decision 410). Still, it is possible that all criteria are met by more than one node, in which case, and as shown, a tie is detected (see decision 412) and one fail-over node is selected based on its load (see operation 414). The services of the to-be-upgraded node can then be migrated to the selected node (see operation 416).

Figure 5:
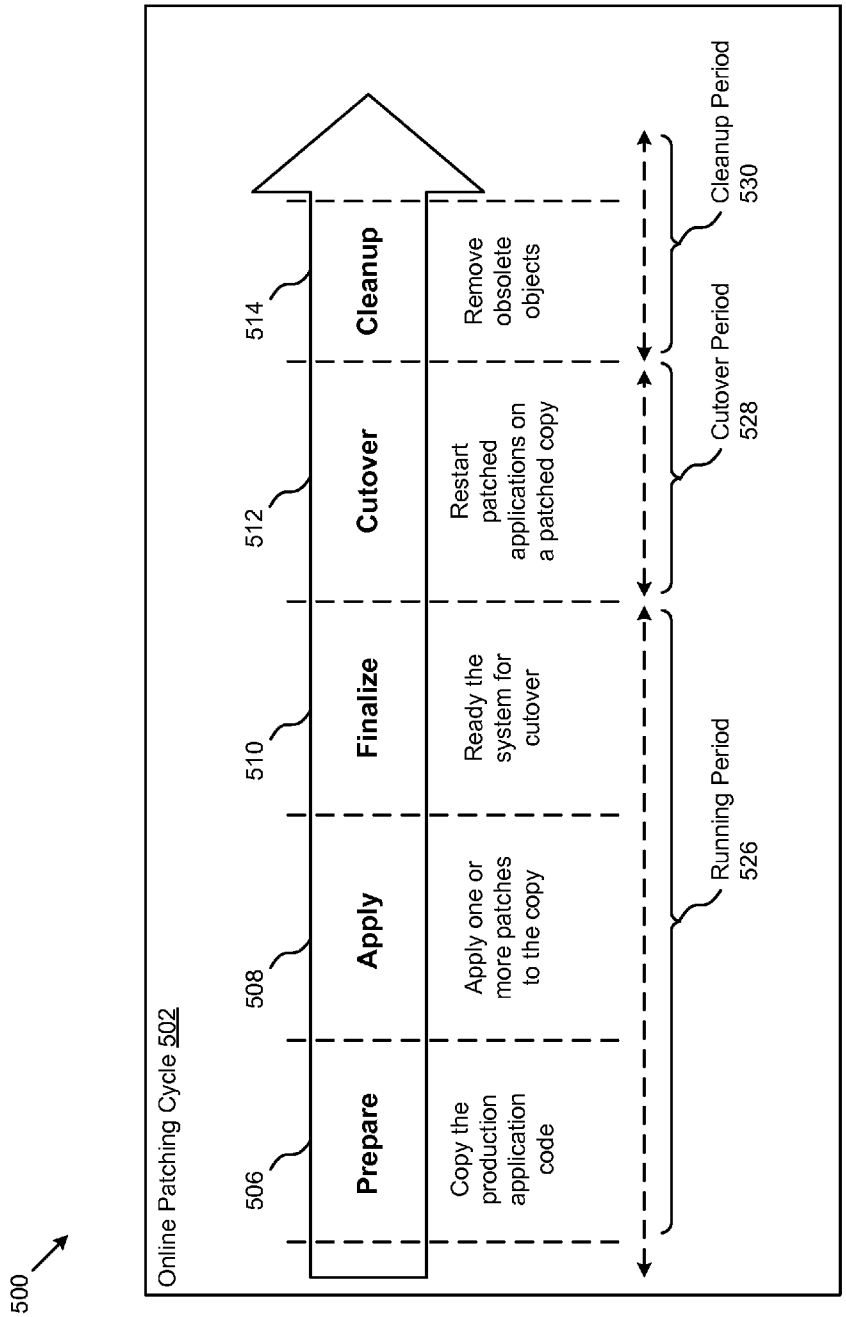
FIG. 5 depicts a granular upgrade cycle to manage version components during rolling upgrades, according to some embodiments.

FIG. 5 depicts a granular upgrade cycle to manage version components during rolling upgrades. As an option, the present cycle 500 may be implemented in the context of the architecture and functionality of the embodiments described herein. Also, the cycle 500 or any aspect therein may be implemented in any desired environment.

To apply a patch to a node in a cluster, the node is promoted through a series of sequential phases known as a patching cycle. The shown online patching cycle 502 is given as:
PREPARE to patch (see online patch cycle prepare step 506).
APPLY a patch or patches to version-up (see online patch cycle apply step 508).
FINALIZE to get the system ready for cutover (see online patch cycle finalize step 510).
CUTOVER to the patched version (see online patch cycle cutover step 512).
  Migrate unpatched services to a fail-over node (e.g., after selecting a fail-over node as per the flow of FIG. 4).
  Disconnect the database connection and shutdown software applications.
  Reboot the node.
  Execute boot-up routines and startup software applications and application services.
  Reconnect to the database.
CLEANUP old-version objects (see online patch cycle cleanup step 514 on cleanup period 530).
The users can be all online users during the normal operation (e.g., during the running period 526), then for the brief period of the cutover (e.g., during the cutover period 528) the application services are migrated to a selected fail-over node.

Additional Embodiments of the Disclosure

Figure 6:
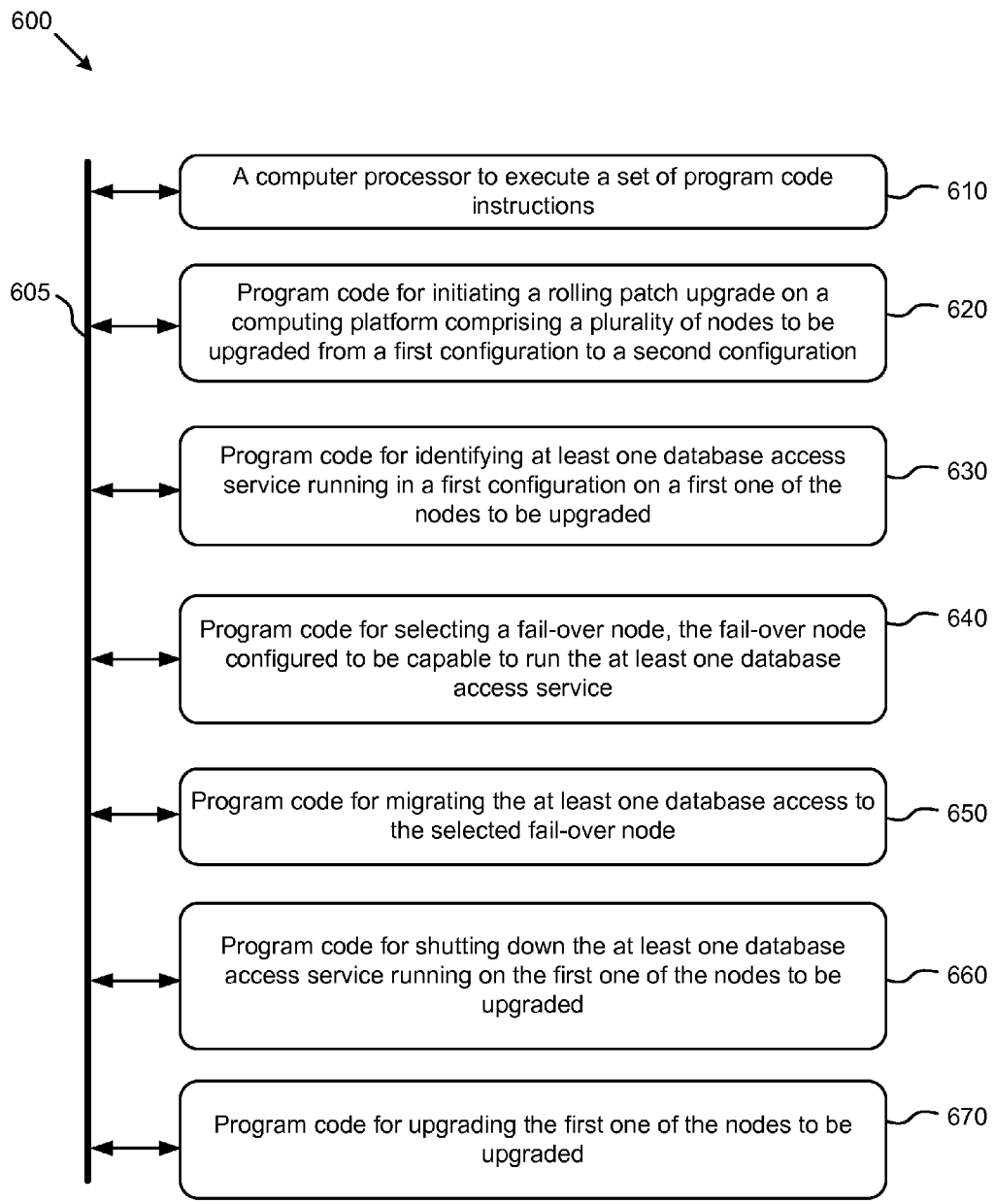
FIG. 6 is a system performing a rolling patch installation, according to some embodiments.

FIG. 6 is a block diagram of a system 600 for performing a rolling patch installation. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims.

The embodiment of FIG. 6 implements a portion of a computer system, shown as system 600, comprising a computer processor to execute a set of program code instructions (see module 610) and modules for accessing memory to hold program code instructions to perform: initiating a rolling patch upgrade on a computing platform comprising a plurality of nodes to be upgraded from a first configuration to a second configuration (see module 620); identifying at least one database access service running in a first configuration on a first one of the nodes to be upgraded (see module 630); selecting a fail-over node, the fail-over node configured to be capable to run the at least one database access service (see module 640); migrating the at least one database access to the selected fail-over node (see module 650); shutting down the at least one database access service running on the first one of the nodes to be upgraded (see module 660); and upgrading the first one of the nodes to be upgraded (see module 670).

Figure 7:
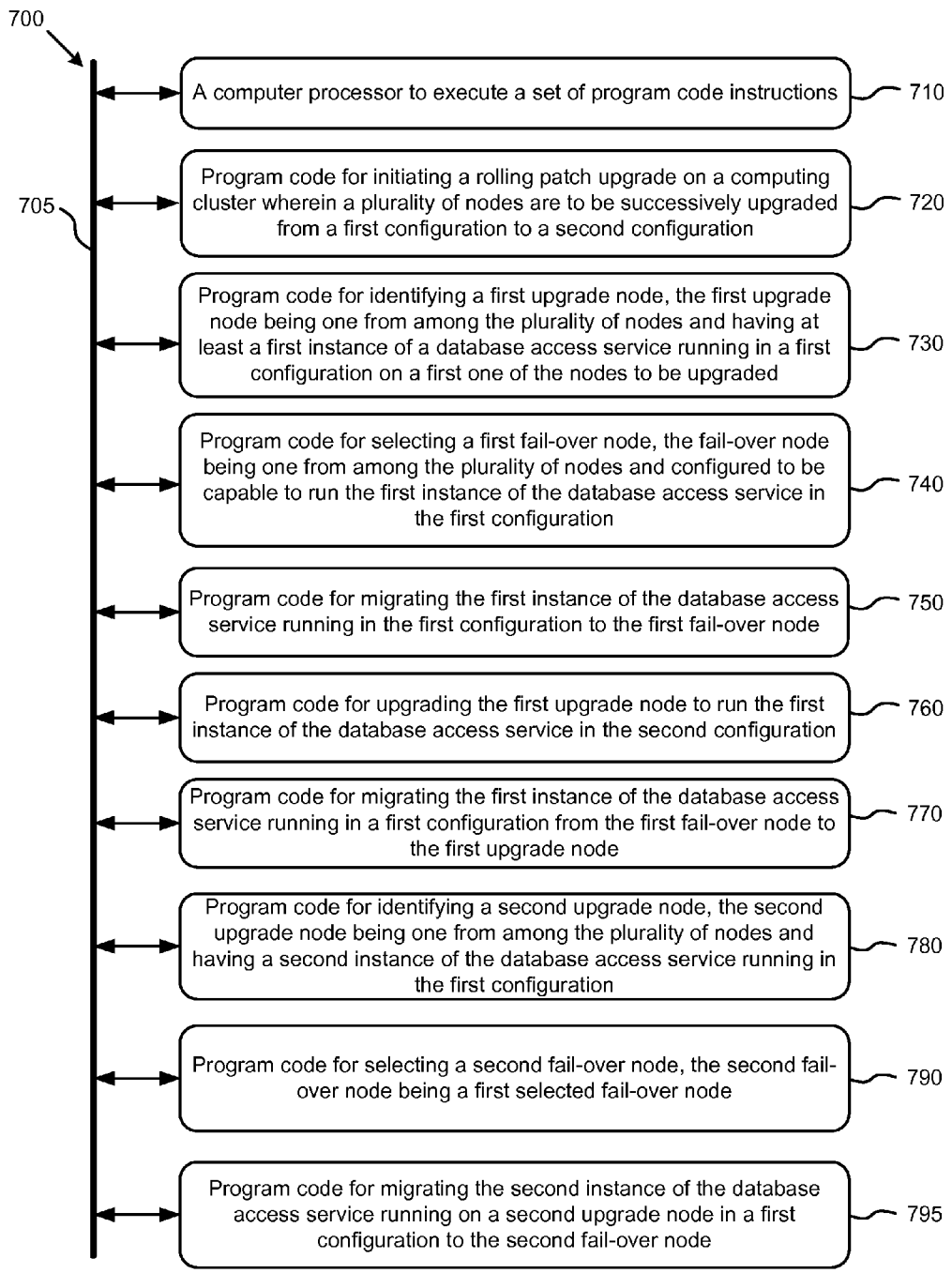
FIG. 7 depicts a block diagram of a system for intelligently selecting fail-over nodes during a rolling patch installation, according to some embodiments.

FIG. 7 depicts a block diagram of a system for intelligently selecting fail-over nodes during a rolling patch installation. As an option, the present system 700 may be implemented in the context of the architecture and functionality of the embodiments described herein. Of course, however, the system 700 or any operation therein may be carried out in any desired environment.

As shown, system 700 comprises at least one processor and at least one memory, the memory serving to store program instructions corresponding to the operations of the system.

As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The embodiment of FIG. 7 implements a portion of a computer system, shown as system 700, comprising a computer processor to execute a set of program code instructions (see module 710) and modules for accessing memory to hold program code instructions to perform: initiating a rolling patch upgrade on a computing cluster where a plurality of nodes are to be successively upgraded from a first configuration to a second configuration (see module 720); identifying a first upgrade node, the first upgrade node being one from among the plurality of nodes and having at least a first instance of a database access service running in a first configuration on a first one of the nodes to be upgraded (see module 730); selecting a first fail-over node, the fail-over node being one from among the plurality of nodes and configured to be capable to run the first instance of the database access service in the first configuration (see module 740); migrating the first instance of the database access service running in the first configuration to the first fail-over node (see module 750); upgrading the first upgrade node to run the first instance of the database access service in the second configuration (see module 760); migrating the first instance of the database access service running in the first configuration from the first fail-over node to the first upgrade node (see module 770); identifying a second upgrade node, the second upgrade node being one from among the plurality of nodes and having a second instance of the database access service running in the first configuration (see module 780); selecting a second fail-over node, the second fail-over node being the first selected fail-over node (see module 790); and migrating the second instance of the database access service to the second fail-over node (see module 795).

System Architecture Overview

Figure 8:
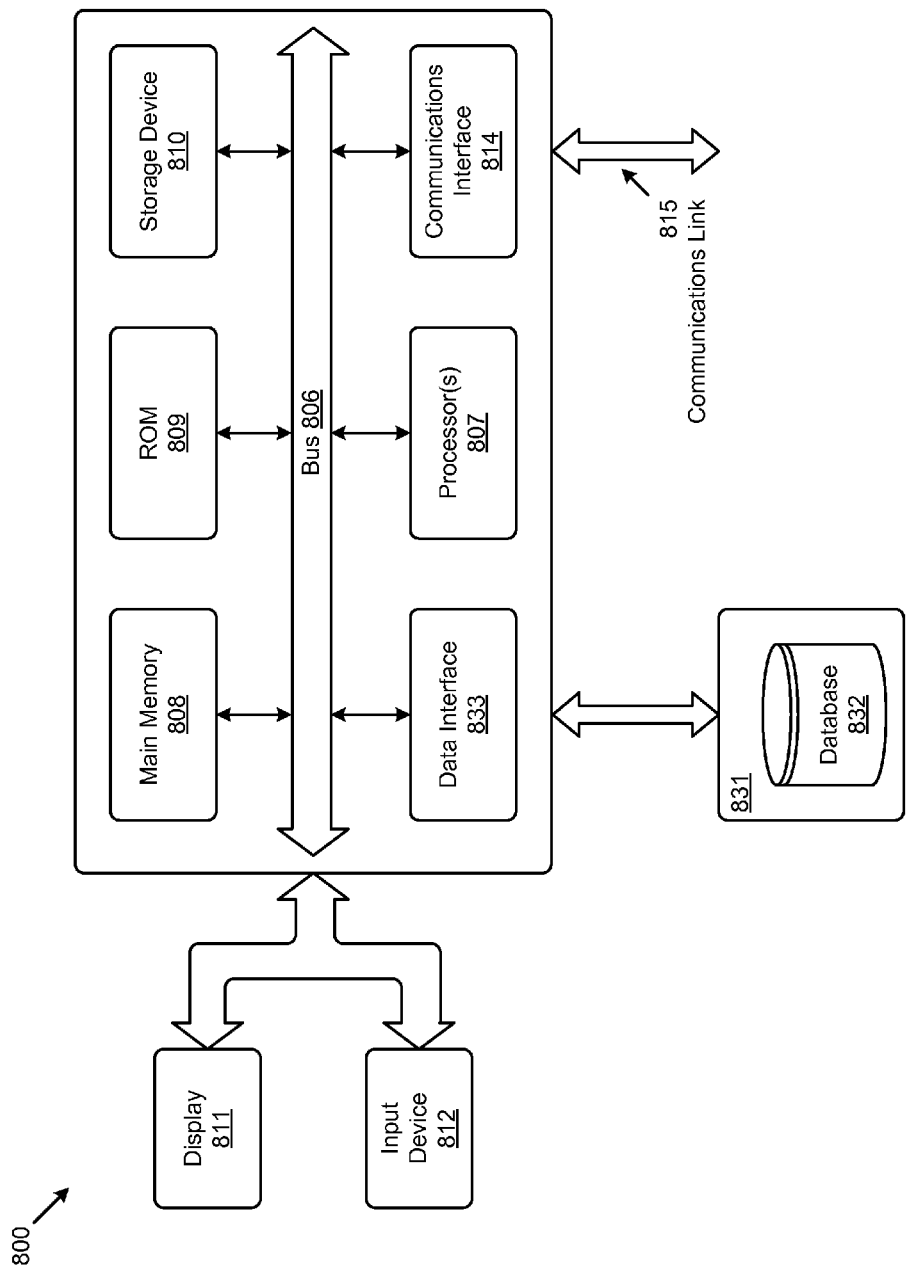
FIG. 8 depicts a block diagram of an instance of a computer system suitable for implementing an embodiment of the present disclosure.

FIG. 8 depicts a block diagram of an instance of a computer system 800 suitable for implementing an embodiment of the present disclosure. Computer system 800 includes a bus 806 or other communication mechanism for communicating information, which interconnects subsystems and devices, such as a processor 807, a system memory 808 (e.g., RAM), a static storage device (e.g., ROM 809), a disk drive 810 (e.g., magnetic or optical), a data interface 833, a communication interface 814 (e.g., modem or Ethernet card), a display 811 (e.g., CRT or LCD), input devices 812 (e.g., keyboard, cursor control), and an external data repository 831.

According to one embodiment of the disclosure, computer system 800 performs specific operations by processor 807 executing one or more sequences of one or more instructions contained in system memory 808. Such instructions may be read into system memory 808 from another computer readable/usable medium, such as a static storage device or a disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 800. According to certain embodiments of the disclosure, two or more computer systems 800 coupled by a communications link 815 (e.g., LAN, PTSN, or wireless network) may perform the sequence of instructions required to practice the disclosure in coordination with one another.

Computer system 800 may transmit and receive messages, data, and instructions, including programs (e.g., application code), through communications link 815 and communication interface 814. Received program code may be executed by processor 807 as it is received, and/or stored in disk drive 810 or other non-volatile storage for later execution. Computer system 800 may communicate through a data interface 833 to a database 832 on an external data repository 831. A module as used herein can be implemented using any mix of any portions of the system memory 808, and any extent of hard-wired circuitry including hard-wired circuitry embodied as a processor 807.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for selecting a fail-over node during a rolling patch installation, the method comprising:
    initiating a patch upgrade on a computing cluster wherein a plurality of nodes is to be upgraded from a first configuration to a second configuration, the second configuration running an upgraded patch level;
    configuring a state value indicating the computing cluster is undergoing a rolling patch installation;
    identifying a first node to be upgraded from among the plurality of nodes, the first node to be upgraded running in the first configuration;
    selecting a first fail-over node from among the plurality of nodes, the first fail-over node configured to be capable of running in the first configuration;
    migrating services running in the first configuration from the first node to be upgraded to the first fail-over node;
    upgrading the first node to run in the second configuration;
    identifying a second node to be upgraded from among the plurality of nodes running in the first configuration; and
    selecting a second fail-over node for the second node to be upgraded by:
        identifying a pool of fail-over node candidates, wherein the pool of fail-over node candidates comprises one or more nodes running in the first configuration and at least one upgraded node running in the second configuration; and
        selecting, from the pool of fail-over node candidates, the at least one upgraded node based at least in part on a preference that the at least one upgraded node is running in the second configuration and the state value indicating the computing cluster is currently undergoing the rolling patch installation.

2. The method of claim 1, wherein an instance of a database access service of the node to be upgraded registers with a listener node by providing its current patch level.

3. The method of claim 2, wherein the instance of the database access service is to be upgraded to the upgraded patch level.

4. The method of claim 1, further comprising registering a listener node with a cluster controller that is running on the computing cluster.

5. The method of claim 1, further comprising evaluating candidate nodes against a plurality of criterion to determine a next fail-over node.

6. The method of claim 5, wherein the plurality of criterion comprises transition versions.

7. The method of claim 1, further comprising defining a progression for the patch upgrade comprising a list of nodes.

8. A computer system for selecting a fail-over node during a rolling patch installation, comprising:
a plurality of nodes in a computing cluster to be upgraded from running in a first configuration to a second configuration, the second configuration running an upgraded patch level;
fail-over logic to migrate services of at least one node of the plurality of nodes to be upgraded to the fail-over node, wherein the fail-over node is selected from a pool of fail-over node candidates, the pool of fail-over node candidates comprising one or more nodes running in the first configuration and at least one upgraded node running in the second configuration, and the at least one upgraded node is chosen as the fail-over node based at least in part on a preference that the at least one upgraded node is running in the second configuration and a state value indicating the computing cluster is currently undergoing the rolling patch installation.

9. The computer system of claim 8, further comprising:
a listener node running on the computing cluster; and
an instance of a database access service of the at least one node of the plurality of nodes to be upgraded registers with a listener node by providing its current patch level.

10. The computer system of claim 9, further comprising program code instructions for registering the listener node with a cluster controller that is running on the computing cluster.

11. The computer system of claim 8, further comprising program code instructions for defining a progression for the rolling patch installation comprising a list of nodes.

12. The computer system of claim 8, further comprising program code instructions for evaluating candidate nodes against a plurality of criterion to determine a next fail-over node.

13. The computer system of claim 12, wherein the plurality of criterion comprises transition versions.

14. The computer system of claim 12 wherein evaluating the candidate nodes is performed during progression of the rolling patch installation of the computing cluster.

15. A computer program product embodied in a non-transitory computer readable medium, the non-transitory computer readable medium having stored thereon a sequence of instructions which, when executed by a processor causes the processor to execute a process to select a fail-over node during a rolling patch installation, the process comprising:
initiating a patch upgrade on a computing cluster wherein a plurality of nodes is to be upgraded from a first configuration to a second configuration, the second configuration running an upgraded patch level;
configuring a state value indicating the computing cluster is undergoing a rolling patch installation;
identifying a first node to be upgraded from among the plurality of nodes, the first node to be upgraded running in the first configuration;
selecting a first fail-over node from among the plurality of nodes, the first fail-over node configured to be capable of running in the first configuration;
migrating services running in the first configuration from the first node to be upgraded to the first fail-over node;
upgrading the first node to run in the second configuration;
identifying a second node to be upgraded from among the plurality of nodes running in the first configuration; and
selecting a second fail-over node for the second node to be upgraded by:
identifying a pool of fail-over node candidates, wherein the pool of fail-over node candidates comprises one or more nodes running in the first configuration and at least one upgraded node running in the second configuration; and
selecting, from the pool of fail-over node candidates, the at least one upgraded node based at least in part on a preference that the at least one upgraded node is running in the second configuration and the state value indicating the computing cluster is currently undergoing the rolling patch installation.

16. The computer program product of claim 15, wherein an instance of a database access service of the node to be upgraded registers with a listener node by providing its current patch level.

17. The computer program product of claim 15, further comprising instructions for registering a listener node with a cluster controller that is running on the computing cluster.

18. The computer program product of claim 15, further comprising instructions for evaluating candidate nodes against a plurality of criterion to determine a next fail-over node.

19. The computer program product of claim 18, wherein the plurality of criterion comprises transition versions.

20. The computer program product of claim 18, wherein evaluating the candidate nodes is performed during progression of the patch upgrade of the computing cluster.

21. A computer implemented method for selecting a fail-over node during a rolling patch installation in a computer cluster, the method comprising:
identifying a plurality of nodes to be upgraded, wherein the plurality of nodes each comprises nodes running in a first configuration that is to be upgraded to a second configuration, the second configuration running an upgraded patch level;
configuring a state value indicating the computing cluster is undergoing a rolling patch installation; and
preparing for migration of an upgrade node by migrating services associated with the upgrade node to the fail-over node, wherein the fail-over node is selected from a pool of fail-over node candidates, the pool of fail-over node candidates comprising one or more nodes running in the first configuration and at least one upgraded node running in the second configuration, and the at least one upgraded node is chosen as the fail-over node based at least in part on a preference that the at least one upgraded node is running in the second configuration and a state value indicating the computing cluster is currently undergoing the rolling patch installation.

22. The method of claim 21, wherein an instance of a database access service of the node to be upgraded registers with a listener node by providing its current patch level.

23. The method of claim 21, further comprising:
  registering a listener node with a cluster controller that is running on the computing cluster.

\* \* \* \* \*

UNITED STATES PATENT AND TRADEMARK OFFICE
CERTIFICATE OF CORRECTION

PATENT NO. : 9,960,963 B2
APPLICATION NO. : 13/925484
DATED : May 1, 2018
INVENTOR(S) : Selvaraj et al.

Page 1 of 1

It is certified that error appears in the above-identified patent and that said Letters Patent is hereby corrected as shown below:

In the Specification

In Column 8, Line 12, delete "IN_ ROLLING" and insert -- IN_ROLLING --, therefor.

In Column 12, Line 9, delete "PTSN," and insert -- PSTN, --, therefor.

In the Claims

In Column 13, Line 25, in Claim 8, delete "level;" and insert -- level; and --, therefor.

Signed and Sealed this
Thirteenth Day of November, 2018

Andrei Iancu
*Director of the United States Patent and Trademark Office*